F. C. MERRY.
EYEGLASS MOUNTING.
APPLICATION FILED JUNE 6, 1921.

1,395,199.

Patented Oct. 25, 1921.

INVENTOR
F. C. Merry.
BY
ATTORNEY

UNITED STATES PATENT OFFICE.

FREDERICK C. MERRY, OF KANSAS CITY, MISSOURI, ASSIGNOR TO MERRY OPTICAL COMPANY, OF KANSAS CITY, MISSOURI, A CORPORATION OF MISSOURI.

EYEGLASS-MOUNTING.

1,395,199.      Specification of Letters Patent.      Patented Oct. 25, 1921.

Application filed June 6, 1921. Serial No. 475,274.

*To all whom it may concern:*

Be it known that I, FREDERICK C. MERRY, a citizen of the United States, residing at Kansas City, in the county of Jackson and State of Missouri, have invented certain new and useful Improvements in Eyeglass-Mountings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to rimless eye-glass mountings and one of the objects thereof is to provide an eye-glass mounting in which the part to be secured to the lens may be fastened thereto by clamping jaws adapted to be drawn into intimate contact with the lens by a tensioning device passing through a hole in the lens and so constructed that the tensioning device will be invisible from the front of the lens so that the mounting will have the appearance of a cemented connection.

In other words, the screw or tensioning device cannot be observed from the front of the lens; therefore, a neat connection will be provided.

Another feature of the invention is that the screw for the tensioning device is received within the lens-supporting sleeve or stud so that the lens is supported upon the stud, permitting relative movement between the lens and the mounting to effect annular adjustment without danger of the screw working loose.

The stud is provided with a cap which constitutes a cover plate for one of the jaws of the eye glass mounting, the advantage being that the lens can be slipped between the jaws of the eye glass mounting without springing them apart. Then the stud with the cover plate can be introduced to hold the lens in place, the cap or cover plate shielding the opening in the jaw and the opening in the lens.

With the ordinary construction of eye-glass mountings in which a screw is used as a tensioning means for the clamping jaws, the lens is supported directly upon the screw. The result is that when the lens becomes slightly loose, it will have a slight swinging movement with respect to the mounting, causing the screw to turn and work loose, which is a serious defect because the screw not infrequently drops out and is lost.

According to my invention, however, the lens is mounted upon a fixed stud so that movement of the lens cannot impart movement to any element of the eye-glass mounting. Therefore, a tight connection between the eye-glass mounting and the lens is insured.

Other advantages of the invention will be apparent by reference to the following description in connection with the accompanying drawings, in which—

Figure 1:
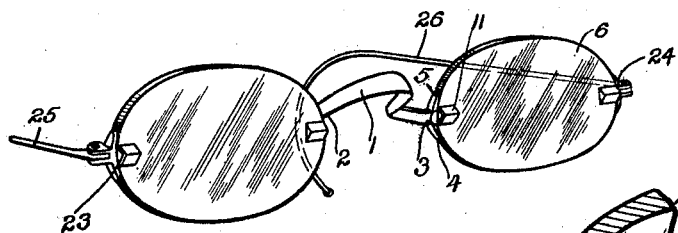
Figure 1 is a perspective view of a pair of eye-glasses equipped with a mounting constructed in accordance with my invention.

The mounting is applicable to either the temple stud or to the nose or bridge piece for a rimless eye-glass mounting but I have shown in detail the mounting as applied specifically to the nose piece or bridge. In either event, the part to be secured to the lens involves the same general construction.

Referring now the drawings by numerals of reference:

1 designates the nose piece or bridge having ends 2 and 3, each of which is provided with diametrically opposite, segmental, lens-engaging fingers 4 and 5, which are adapted to lie against the perimeter of the lens 6.

Extending in parallel relation from the lens-engaging fingers 4 and 5 are two parallel jaws 7 and 8, which are adapted to lie on opposite sides of the lens 6 and clamp it between them. One of the jaws, in the present instance 7, is provided with an opening or hole 9 to receive a hollow internally threaded stud or sleeve 10 having a head 11 co-extensive with and adapted to fit over the outer face 12 of the jaw 7 and by reference to Fig. 4 it will be observed that the outer face 12 of the jaw 7 is provided with oppositely inclined portions 13 and 14 to receive the head or cover plate 11, which is substantially V-shaped in cross section so that the under faces 15 and 16 will lie snugly against the face 12 in such a manner that there can be no turning movement of the stud because there can be no turning movement of the head or plate 11. Since the head or plate 11 is co-extensive with the jaw 7, the jaw will be completely covered by the head or plate, presenting an unbroken smooth appearance, covering the joint and making a blind connection so that the mounting viewed from the front will have the appearance of a cemented mounting.

Figure 5:
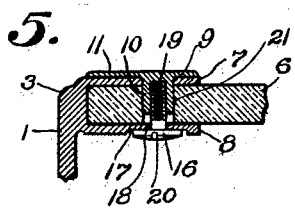
Fig. 5 is a transverse sectional view through a part of the lens and one end of the mounting.
Figure 6:
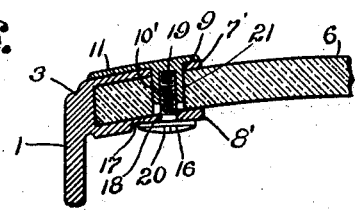
Fig. 6 is a similar view of a slightly modified form of the device.

The approximate length of the stud 10 is equal to the space between the jaws 7 and 8; in actual practice, it is slightly less than the distance between the jaws so that the tension screw 16 may exert tension to draw the two jaws together, as will be clearly apparent by reference to Fig. 5.

Figure 4:
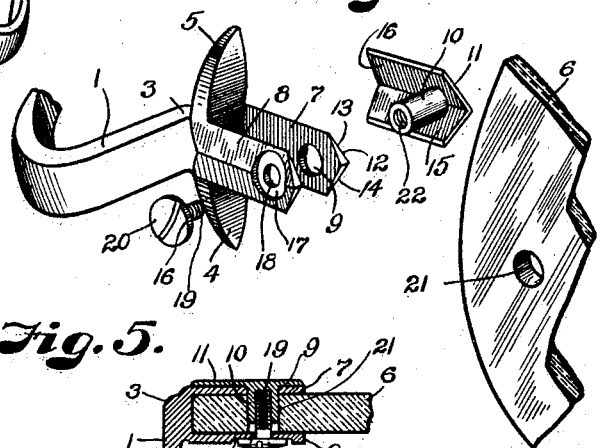
Fig. 4 is a disassociated view of the mounting and part of a lens.

The jaw 8 is provided with a countersunk recess 17, provided with a hole or opening 18 to receive the threaded end or shank 19 of the tension screw 16, the head 20 being received within the recess, as will be clearly seen in Figs. 4 and 5.

Figure 2:
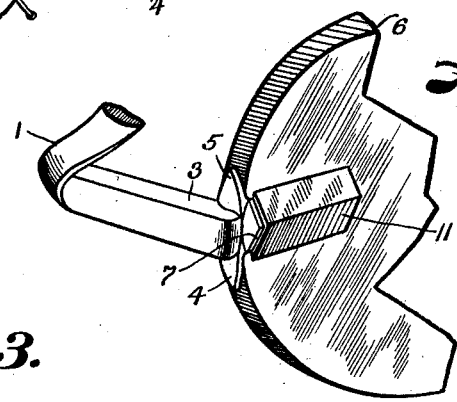
Fig. 2 is an enlarged fragmentary view of a lens and part of the mounting viewed from the front of the lens.
Figure 3:
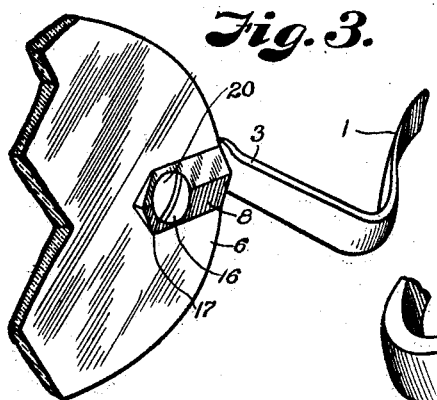
Fig. 3 is a similar view from the rear of the lens.

When the mounting is to be attached to the lens, the jaws will be caused to straddle it so that the hole 21 will aline with the openings 9 and 18 of the jaws 7 and 8. Then the stud 10 will be introduced through the opening 9 into the opening 21. The tension screw 16 may then be passed through the opening 18 to engage the internally threaded portion 22 of the stud 10 and turned by a screw driver or suitable tool to draw the two jaws together, the plate 11 being drawn tight upon the outer face of the jaw 7 so that the finished connection will have the appearance shown in Figs. 1 and 2.

The construction shown in Figs. 1 to 5, both inclusive, is for a straight lens; where a concavo-convex lens is used, however, the same construction will prevail except that the stud 10′ will be arranged at an angle to the head or plate 11 and the jaws 7′ and 8′ will be arranged at an angle to the end 3.

The temple studs 23 and 24 may be fastened to the lenses in the same manner as the nose piece or bridge, the temples 25 and 26 being pivoted at their ends in the usual manner.

From the foregoing it will be apparent that a novel, efficient and easily assembled eye-glass mounting is provided, which will present an artistic symmetrical appearance when viewed from the front of the lens and that the means of connecting the lens to the mounting will be invisible due to the novel construction of the tensioning device, which is provided with the head or cap plate to cover the outer jaw of the mounting.

What I claim and desire to secure by Letters-Patent is:

1. An eye-glass mounting comprising a part to be secured to a lens, parallel jaw members to receive the lens between them, tensioning means for the jaw members, and a cover plate carried by the tensioning means to cover the outer jaw member.

2. An eye-glass mounting comprising a part to be secured to a lens, parallel jaw members to receive the lens between them, and tensioning means for the jaw members comprising a removable lens-supporting, hollow, internally threaded stud carried by one jaw and a tensioning screw carried by the other jaw and engaging the internally threaded stud.

3. An eye-glass mounting comprising a part to be secured to a lens, parallel jaw members to receive the lens between them, and tensioning means for the jaw members consisting of a headed hollow, internally threaded stud projectable through an opening in one jaw and a headed screw projecting through the other jaw and having threaded connection with the internally threaded stud.

4. An eye-glass mounting comprising a part to be secured to a lens, parallel jaw members to receive the lens between them, tensioning means for the jaw members consisting of a headed, hollow, internally threaded stud projectable through an opening in one jaw and a headed screw projecting through the other jaw and having threaded connection with the internally threaded stud, and a lens clamped between the jaws and supported upon the stud.

5. An eye-glass mounting comprising a part to be secured to a lens, parallel jaws to clamp the lens between them, a lens-supporting stud substantially bridging the gap between the jaws, a tension screw projecting through one of the jaws and having screw threaded engagement with the stud, and a head on the stud coextensive with one of the jaws and covering the outer face thereof.

6. An eye-glass mounting comprising a part to be secured to a lens, parallel jaws to clamp the lens between them, a lens-supporting stud substantially bridging the gap between the jaws, a tension screw projecting through one of the jaws and having screw threaded engagement with the stud, and a head on the stud coextensive with one of the jaws and covering the outer face thereof, the stud being inclined at an angle with respect to the head.

7. An eye-glass mounting comprising a part to be secured to a lens, parallel lens-clamping jaws, a cover plate for one of the jaws, an internally threaded lens-supporting stud carried by the plate and passing through one of the jaws, and a tension screw having a head bearing against one jaw and having threaded engagement with the stud.

8. An eye-glass mounting comprising a part to be secured to a lens, parallel jaw members carried by said part, one of which is provided with an outer face having inclined sides, a cover plate substantially V-shaped in cross section and lying co-extensive with the jaw having the inclined sides so as to cover it, the engagement between the plate and the jaw being such that there is no relative movement between them, a stud rigid with the cover plate and projecting through its complementary jaw, and a tensioning screw projecting through the other jaw and engaging the stud.

In testimony whereof I affix my signature.

FREDERICK C. MERRY.